US012769425B2

(12) United States Patent
Nagai et al.

(10) Patent No.: US 12,769,425 B2
(45) Date of Patent: Oct. 20, 2026

(54) PROXIMITY DECIDING DEVICE AND PROXIMITY DECIDING METHOD

(71) Applicant: Alps Alpine Co., Ltd., Tokyo (JP)

(72) Inventors: Satoshi Nagai, Tokyo (JP); Shinichi Endo, Tokyo (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 19/178,038

(22) Filed: Apr. 14, 2025

(65) Prior Publication Data

US 2026/0147432 A1 May 28, 2026

(30) Foreign Application Priority Data

Apr. 25, 2024 (JP) ................................ 2024-071741

(51) Int. Cl.
*G06F 3/041* (2006.01)
*B62D 1/04* (2006.01)
*G06F 3/044* (2006.01)

(52) U.S. Cl.
CPC ......... *G06F 3/04186* (2019.05); *B62D 1/046* (2013.01); *G06F 3/044* (2013.01)

(58) Field of Classification Search
CPC ....................................................... G06F 3/044
See application file for complete search history.

(56) References Cited

U.S. PATENT DOCUMENTS

2016/0334932 A1 11/2016 Nakajima et al.
2019/0025824 A1 1/2019 Odate
2023/0013855 A1* 1/2023 Endo ....................... G06F 3/044
2023/0041961 A1* 2/2023 Endo ......................... G01L 1/26
2023/0418423 A1 12/2023 Terada

* cited by examiner

*Primary Examiner* — Robin J Mishler
(74) *Attorney, Agent, or Firm* — Beyer Law Group LLP

(57) ABSTRACT

A proximity deciding device includes: a capacitive sensor electrode covered with a cover having a manipulation surface; a measurement circuit that measures capacitance between the capacitive sensor electrode and an indicating body; a proximity deciding unit that makes a decision as to whether a proximity state is in progress according to a difference obtained by subtracting a reference value from the capacitance; and a correcting unit that corrects the reference value. The correcting unit stores, in a storage unit, a lower limit, for accumulated inputs, based on the reference value before the proximity state; calculates, in the proximity state, a cumulative value for a change of the capacitance; updates the reference value according to a cumulative input value (cumulative value or lower limit); and sets the cumulative input value to the cumulative value or lower limit according to whether the cumulative value is larger or smaller than the lower limit.

8 Claims, 10 Drawing Sheets

PROXIMITY DECIDING DEVICE AND PROXIMITY DECIDING METHOD

CLAIM OF PRIORITY

This application claims benefit of Japanese Patent Application No. 2024-071741 filed on Apr. 25, 2024, which is hereby incorporated by reference.

BACKGROUND OF THE INVENTION

1. Field of the Invention

The present invention relates to a proximity deciding device and a proximity deciding method.

2. Description of the Related Art

A conventional input device detects manipulations including at least one of a contact of an indicating body (hand) and proximity of the indicating body. The input device has: a measuring unit (capacitive sensor electrode) that measures a physical quantity according to the manipulation; a deciding unit that makes a decision about manipulation states including a manipulated state and a non-manipulated state, according to at least a reference value and the physical quantity; and a reference value updating unit that updates the reference value while in a manipulated period, during which the manipulation state is the manipulated state, by using the physical quantity taken when the magnitude of a change in the physical quantity per predetermined time is within a predetermined range. It is also disclosed that while the indicating body is approaching the input device, in response to a change in a detection signal output from the measuring unit when temperature changes, the reference value is also changed accordingly (see US2016/0334932A1, for example).

While the indicating body is approaching the conventional input device, however, if temperature in the input device greatly changes, the input device may make an incorrect decision as to whether the indicating body is approaching. Moreover, since the input device is targeted at a personal computer or smart phone, the input device lacks a fail-safe function.

SUMMARY OF THE INVENTION

In view of the above situation, to enable a correct decision to be made about proximity of an indicating body, the present invention provides a proximity deciding device that can properly update a reference value according to a rise or fall in temperature and also provides a proximity deciding method.

A proximity deciding device in an embodiment of the present invention includes: a capacitive sensor electrode covered with a cover having a manipulation surface; a measurement circuit that measures capacitance between the capacitive sensor electrode and an indicating body; a proximity deciding unit that makes a decision as to whether a proximity state, in which the indicating body is approaching the capacitive sensor electrode, is in progress according to a difference value obtained by subtracting a reference value from the capacitance measured by the measurement circuit; a correcting unit that corrects the reference value; and a storage unit. The correcting unit stores a lower limit value for accumulated inputs, the lower limit value being based on the reference value before the proximity state is entered, in the storage unit; calculates, in the proximity state, a cumulative value for a change of the capacitance; updates the reference value according to a cumulative input value, which takes either the cumulative value or the lower limit value for accumulated inputs; sets, if the cumulative value is larger than the lower limit value for accumulated inputs, the cumulative input value to the cumulative value; and sets, if the cumulative value is smaller than the lower limit value for accumulated inputs, the cumulative input value to the lower limit value for accumulated inputs.

To enable a correct decision to be made about proximity of an indicating body, a proximity deciding device can be provided that can properly update a reference value according to a rise or fall in temperature and a proximity deciding method can also be provided.

DESCRIPTION OF THE PREFERRED EMBODIMENTS

An embodiment to which a proximity deciding device and a proximity deciding method in the present invention are applied will be described below.

Embodiment

Figure 1:
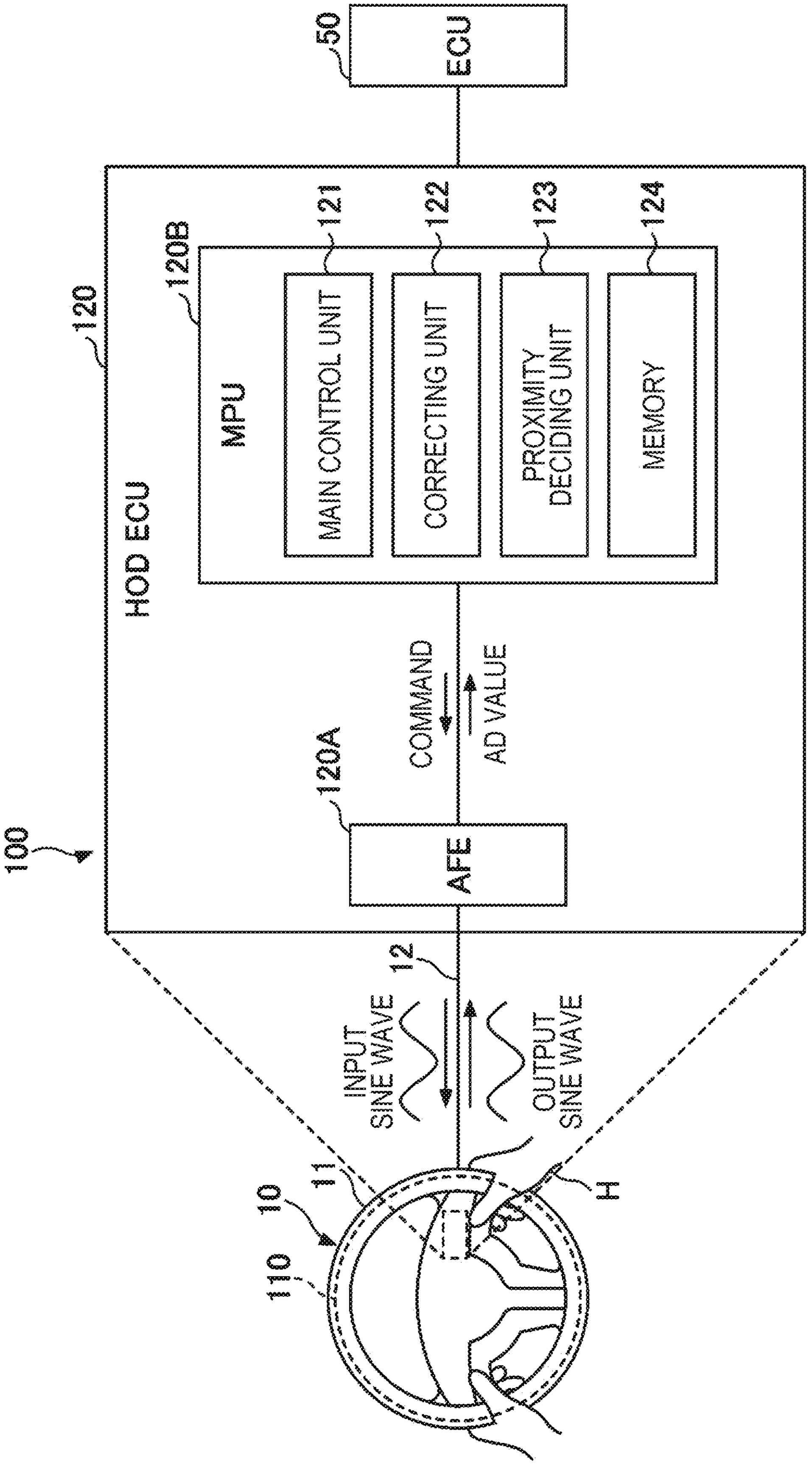
FIG. 1 illustrates a steering wheel in which a proximity deciding device in an embodiment is attached.

FIG. 1 illustrates a steering wheel 10 in which a proximity deciding device 100 in an embodiment is attached. As illustrated in FIG. 1, the steering wheel 10 is attached as part of a vehicle as an example, and a capacitive sensor electrode 110 in the proximity deciding device 100 is attached in the interior of a grip 11. The grip 11, which is a cover for the rim of the steering wheel 10, covers the capacitive sensor electrode 110. The grip 11 is an example of a cover. The surface of the grip 11 is an example of a manipulation surface.

The proximity deciding device 100 decides whether a hand H of a driver is in contact with the grip 11 of the steering wheel 10, as an example. Since the capacitive sensor electrode 110 is covered with the grip 11, when the hand His in contact with the grip 11, the hand His in proximity to the capacitive sensor electrode 110. The term “proximity” refers to a state in which an indicating body such as a hand of the manipulator is away from the capacitive sensor electrode 110 but is very close to it. In this state, therefore, a capacitance between the indicator and the capacitive sensor electrode 110 has been increased to the extent in which the value of the capacitance is measurable.

For the purpose of generalization, the driver of the vehicle will be referred to below as the manipulator of the proximity deciding device 100. The use of the proximity deciding device 100 is not limited to applications in which the proximity deciding device 100 is incorporated into the steering wheel 10 as illustrated in FIG. 1. The proximity deciding device 100 will be described below that can decide whether the hand H of the manipulator, the hand H being a target body to be detected, is in contact with an object in which the capacitive sensor electrode 110 is disposed. A motion in which the manipulator comes into contact with the object in which the capacitive sensor electrode 110 is disposed will be referred to as a manipulation by the manipulator.

<Structure of Proximity Deciding Device 100>

The proximity deciding device 100 has a hands-off detection electronic control unit (HODECU) 120 besides the capacitive sensor electrode 110.

The capacitive sensor electrode 110 is provided over the entire circumference of the grip 11 of the steering wheel 10. The capacitive sensor electrode 110 is, for example, a metallic electrode. The capacitive sensor electrode 110 is connected to the HODECU 120 through a signal line 12.

The HODECU 120 is disposed in the interior of the steering wheel 10, as an example. The HODECU 120 in FIG. 1 is enlarged. The HODECU 120 has an analog front end (AFE) 120A and a microprocessor unit (MPU) 120B.

The AFE 120A, which is connected to the capacitive sensor electrode 110, enters a sine wave (input sine wave) into the capacitive sensor electrode 110 in response to a command entered from the MPU 120B, and acquires another sine wave (output sine wave) output from the capacitive sensor electrode 110. The AFE 120A acquires the capacitance value of the capacitive sensor electrode 110 from the input sine wave and output sine wave, converts the acquired capacitance value to a digital form, removes noise by using a low-pass filter to obtain an AD value, and outputs the AD value to the MPU 120B. The AD value, which is an example of a measured value, is proportional to the capacitance of the capacitive sensor electrode 110. The AD value is represented as a count value having no unit, as an example. Since the AFE 120A removes noise by using a low-pass filter, the proximity deciding device 100 can acquire an AD value in which noise at or higher than a predetermined frequency has been removed.

The MPU 120B is implemented by a computer that includes a central processing unit (CPU), a random-access memory (RAM), a read-only memory (ROM), an input/output interface, an internal bus, and the like. An electronic control unit (ECU) 50 is connected to the MPU 120B, as an example. The ECU 50 is a control unit that controls an electronic unit in the vehicle having the steering wheel 10. The electronic unit may be, for example, an electronic unit involved in an autonomous driving or the like of a vehicle.

The MPU 120B has a main control unit 121, a correcting unit 122, a proximity deciding unit 123, and a memory 124. The main control unit 121, correcting unit 122, and proximity deciding unit 123 are each a functional block representing a function of a program executed by the MPU 120B. The memory 124 is a functional representation of a memory in the MPU 120B.

The main control unit 121 is a processing unit that supervises control processing by the MPU 120B in a centralized manner. The main control unit 121 executes processing other than processing executed by the correcting unit 122 and proximity deciding unit 123.

The correcting unit 122 corrects a reference value used by the proximity deciding unit 123 in decision. The reference value is for the capacitance value of the capacitive sensor electrode 110. When the proximity deciding unit 123 decides whether the hand His in contact with the grip 11 of the steering wheel 10, the proximity deciding unit 123 uses the reference value. In other words, the reference value is a capacitance value taken when the hand His not present in the vicinity of the capacitive sensor electrode 110. With the hand H in contact with the grip 11, for example, the capacitance value of the capacitive sensor electrode 110 varies due to a change in temperature or the like. To remove an amount by which the capacitance value of the capacitive sensor electrode 110 has changed due to this type of variation and detect an amount by which the capacitance value has changed due to the presence or absence of the hand H, the reference value for the capacitance value of the capacitive sensor electrode 110 is used. The correcting unit 122 corrects a detected value according to a minute change in distance, a change in temperature, or the like. A method by which the correcting unit 122 corrects a detected value will be described below with reference to FIGS. 4 to 7. The correcting unit 122 has a timer used during the execution of processing in FIGS. 6 and 7.

The proximity deciding unit 123 decides whether a difference obtained by subtracting the reference value from the capacitance value of the capacitive sensor electrode 110 is higher than a threshold value to decide whether the hand H is in contact with the grip 11. The proximity deciding unit 123 notifies the ECU 50 of data representing the decision result.

The memory 124 stores programs and data needed by the main control unit 121, correcting unit 122, and proximity deciding unit 123 to perform processing. Data saved in the memory 124 includes data representing the capacitance value of the capacitive sensor electrode 110, data created by the correcting unit 122 and proximity deciding unit 123 in the course of processing, and the like.

<Output Sine Wave from Capacitive Sensor Electrode 110>

Figure 2:
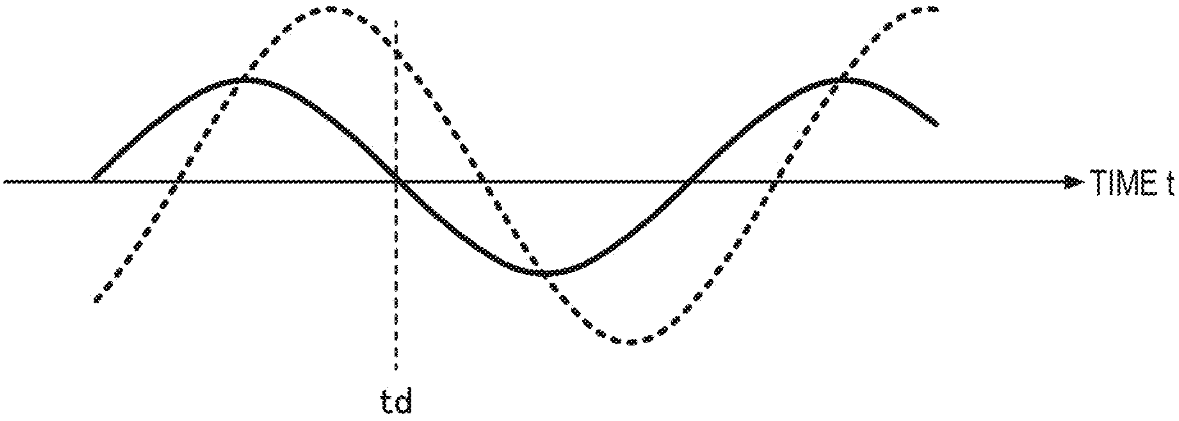
FIG. 2 illustrates an example of an output sine wave from a capacitive sensor electrode in the proximity deciding device in the embodiment.

FIG. 2 illustrates an example of an output sine wave from the capacitive sensor electrode 110. In FIG. 2, the solid line indicates an output sine wave when the hand His away from the grip 11 (at the time of release), and the dashed line indicates an output sine wave when the hand H holds the grip 11 (at the time of touch).

When the hand H comes into contact with the grip 11, the capacitance value of the capacitive sensor electrode 110 changes from the capacitance value at the time of release. Therefore, the phase and amplitude of the sine wave at the time of touch are different from those of the sine wave at the time of release. The phase and amplitude of the sine wave at the time of touch vary with the extent to which the hand H is in contact with the grip 11. For example, the phase and amplitude of the sine wave vary according to whether the hand H slightly holds the grip 11 or strongly holds the grip 11 or to whether the area with which the hand H is in contact with the grip 11 is small or large.

If, for example, a timing at which the amplitude at the time of release becomes 0 is predetermined as timing td and the amplitude of the sine wave is detected at the timing td, the AD value can be obtained according to the extent of the contact of the hand H. This is because an amount by which the amplitude changes at the timing td is equivalent to the AD value.

<Decision of Contact According to Reference Value>

Figure 3:
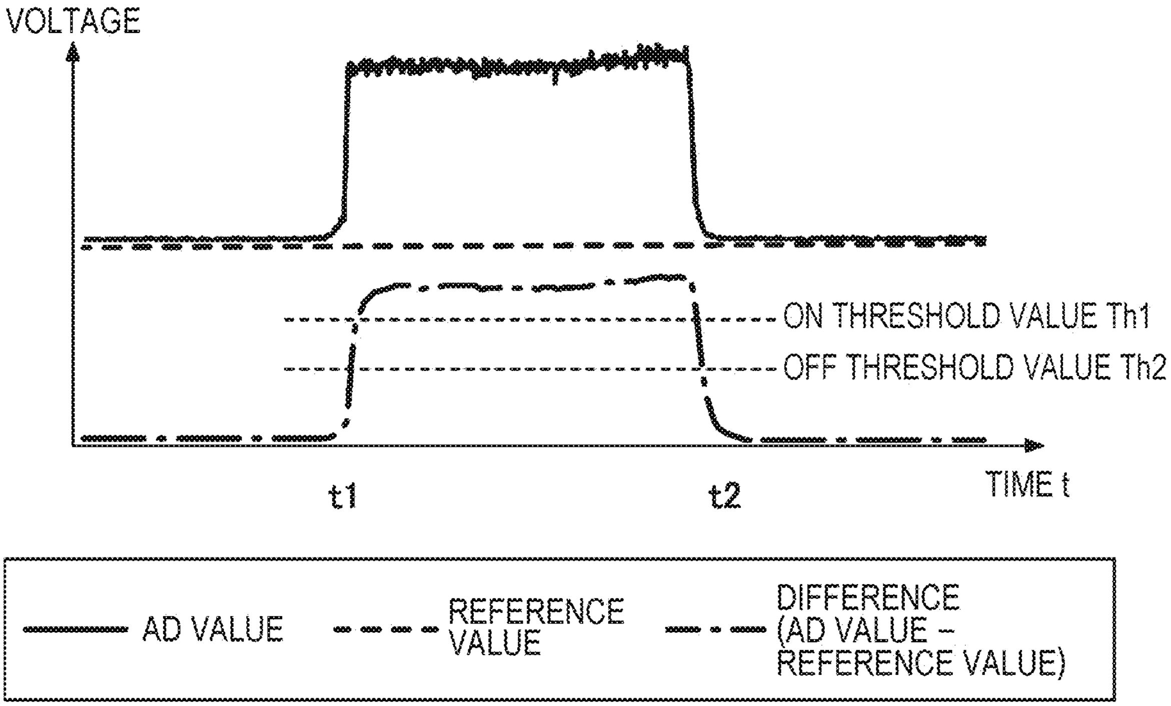
FIG. 3 illustrates how a decision is made about a contact according to a reference value.
Figure 4:
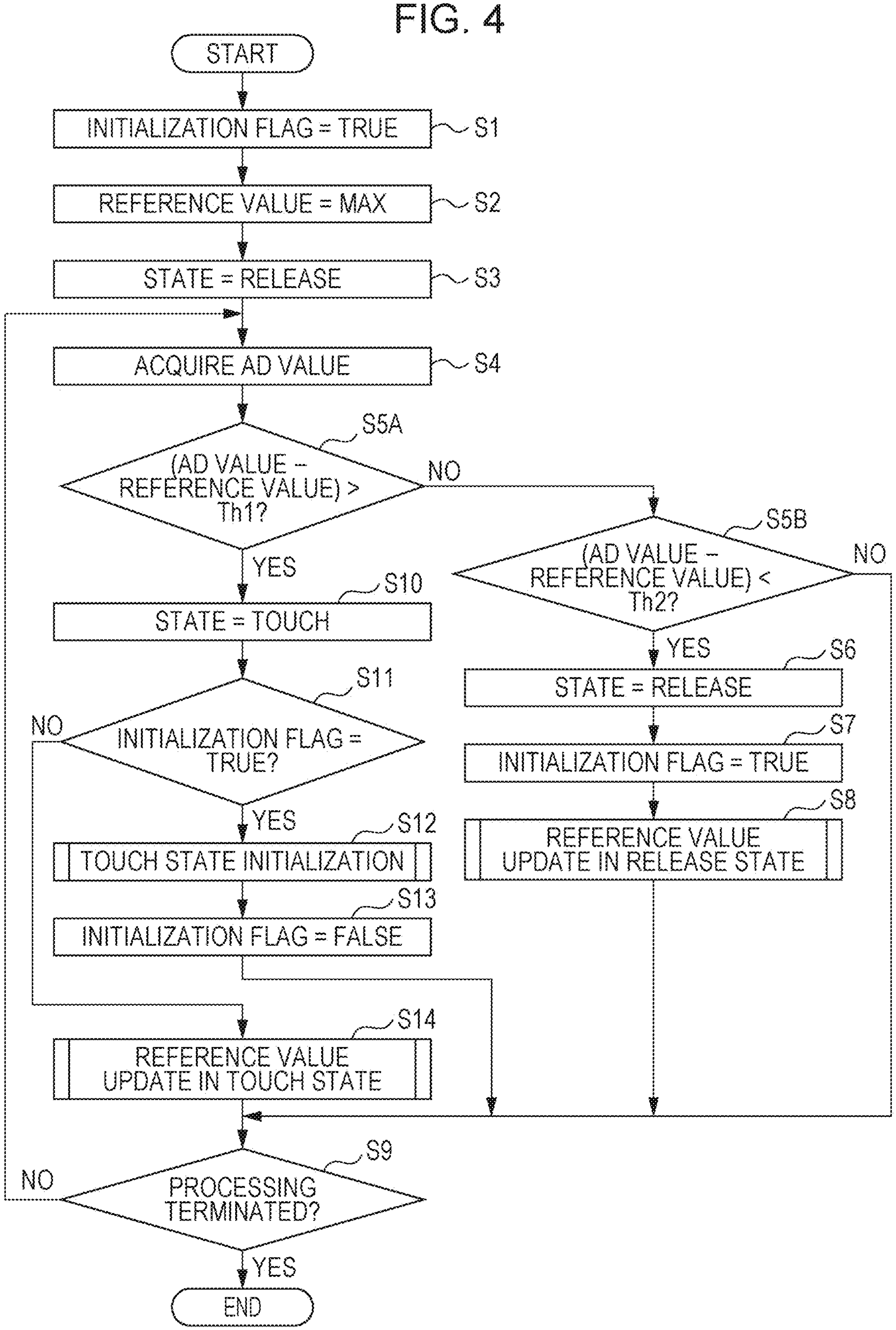
FIG. 4 is a flowchart representing proximity decision processing executed by a microprocessor unit (MPU) included in the proximity deciding device in the embodiment.

FIG. 3 illustrates how a decision is made about a contact according to the reference value. In FIG. 3, the horizontal axis represents time and the vertical axis represents voltage. In FIG. 3, the solid indicates the AD value, the dashed line indicates the reference value, and the dash-dot line indicates the difference (AD value-reference value) between the AD value and the reference value.

It will be assumed that the hand H is not in contact with the grip 11 in a state before time t1. When the hand H comes into contact with the grip 11 at time t1, the AD value rises with respect to the reference value. At that time, the difference (AD value-reference value) also rises. When the difference exceeds an On threshold value Th1, which is 160 as an example, the proximity deciding unit 123 decides that the hand H has come into contact with (has touched) the grip 11. When the hand H is released from the grip 11 at time t2, the AD value falls. At that time, the difference (AD value-reference value) also falls. When the difference becomes lower than an Off threshold value Th2, which is 128, for example, the Off threshold value Th2 being lower than the On threshold value Th1, the proximity deciding unit 123 decides that the hand H has moved away from (has been released from) the grip 11.

Correction of the Reference Value by the Correcting Unit 122

In calculation of the reference value, the correcting unit 122 uses different methods depending on whether the time is the release time or touch time.

At the time of release, the correcting unit 122 may use equation (1) below to calculate the reference value. In equation (1), M indicates a weight in a weighted average and the reference value (10 ms earlier) is the reference value calculated by the correcting unit 122 10 milliseconds (ms) earlier. The correcting unit 122 multiplies the reference value (10 ms earlier) by the weight M according to equation (1) to obtain the weighted average of the AD value and reference value (10 ms earlier). By equation (1), the reference value is represented as the weighted average of the latest AD value and reference value (10 ms earlier). The larger the value of M is, the less likely the reference value calculated according to equation (1) is affected by the AD value. That is, the larger the value of M is, the more moderately the reference value calculated according to equation (1) changes. Conversely, the smaller the value of M is, the more likely the reference value calculated according to equation (1) is affected by the AD value. That is, the smaller the value of M is, the more quickly the reference value calculated according to equation (1) changes. It is only necessary to set the value of the weight M to an appropriate value according to the property, sensitivity, and the like of the capacitive sensor electrode 110.

$$\text{reference value} = \frac{M \times \text{reference value (10 ms earlier)} + AD \text{ value}}{M+1} \quad (1)$$

At the time of touch, the correcting unit 122 may use equation (2) below to calculate the reference value. In equation (2), M indicates a weight in a weighted average. The weight M may be the same as the weight M in equation (1) or may have a different value. The correcting unit 122 multiplies the reference value (1 s earlier) by the weight M to obtain the weighted average of a cumulative input value and the reference value (1 s earlier) according to equation (2). In other words, the correcting unit 122 corrects the reference value according to the cumulative input value.

$$\text{reference value} = \frac{M \times \text{reference value (1 s earlier)} + \text{cumulative input value}}{M+1} \quad (2)$$

The cumulative input value is a parameter that takes either one of a cumulative value and a lower limit value for accumulated inputs. The cumulative value is obtained by accumulating the amount ΔAD of change of the AD value at a time when the hand H comes into contact with the grip 11 to the reference value at a time before the hand H starts to come into contact with the grip 11. An example of the amount ΔAD of change of the AD value is a value obtained by subtracting the AD value one second earlier from the current AD value. In calculation (update) of the cumulative value, the correcting unit 122 does not accumulate the amount ΔAD of change of the AD value without limitation, but restricts the amount ΔAD of change of the AD value to a value in a certain range and adds the restricted amount ΔAD of change of the AD value to the previously calculated cumulative value. The lower limit value for accumulated inputs may be a value obtained by subtracting a predetermined value from the reference value immediately before the hand H comes into contact with the grip 11. The lower limit value for accumulated inputs is set to restrict the lower limit of the cumulative input value when the cumulative value is too low. This processing will be described later with reference to FIG. 7.

By equation (2), the reference value is represented as the weighted average of the cumulative input value and reference value (1 s earlier). The larger the value of M is, the less likely the reference value calculated according to equation (2) is affected by the cumulative input value. That is, the larger the value of M is, the more moderately the reference value calculated according to equation (2) changes. Conversely, the smaller the value of M is, the more likely the reference value calculated according to equation (2) is affected by the cumulative input value. That is, the smaller the value of M is, the more quickly the reference value calculated according to equation (2) changes. It is only necessary to set the value of the weight M to an appropriate value according to the property, sensitivity, and the like of the capacitive sensor electrode 110. As described above, the weight M in equation (2) may be the same as the weight M in equation (1) or may have a different value. A frequency (time intervals) with which the reference value is updated at the time of touch may be lower than or may be the same as a frequency (time intervals) with which the reference value is updated at the time of release.

At the time of release, the correcting unit 122 uses equation (1) to correct the reference value. At the time of touch, the correcting unit 122 uses equation (2) to correct the reference value. The capacitance of the capacitive sensor electrode 110 also varies with a change in temperature while a touch is in progress. To prevent an incorrect decision, therefore, the correcting unit 122 obtains the reference value according to equation (2) by using the cumulative input value.

Proximity Decision Processing Executed by MPU 120B

FIGS. 4 to 7 each illustrate proximity decision processing executed by the MPU 120B. A method implemented by processing illustrated in FIGS. 4 to 7 is a proximity deciding method in the embodiment. The method is executed by the proximity deciding device 100.

When power is turned on, the proximity deciding unit 123 starts processing and sets an initialization flag to TRUE (step S1). The proximity deciding unit 123 sets the reference value to MAX (step S2). The proximity deciding unit 123 sets a contact state to a release (State=Release) (step S3).

The proximity deciding unit 123 acquires the AD value from the AFE 120A (step S4). The AD value is a measured value proportional to the capacitance of the capacitive sensor electrode 110. The proximity deciding unit 123 decides whether the difference (AD value-reference value) between the AD value and the reference value is larger than the On threshold value Th1 (step S5A).

If the proximity deciding unit 123 decides in step S5A that the difference (AD value-reference value) is not larger than the On threshold value Th1 (No in S5A), the proximity deciding unit 123 decides whether the difference (AD value-reference value) between the AD value and the reference value is smaller than the Off threshold value Th2 (step S5B). The Off threshold value Th2 is smaller than the Off threshold value Th1. As an example, the On threshold value Th1 is 160, and the Off threshold value Th2 is 128. The On threshold value Th1 and Off threshold value Th2 are set to different values so as to provide hysteresis between a touch (State=Touch) and a release (State=Release), each of which is a contact state. If the difference falls between the On threshold value Th1 and the Off threshold value Th2, the proximity deciding unit 123 does not update the contact state.

If the proximity deciding unit 123 decides in step S5B that the difference (AD value—reference value) is smaller than the Off threshold value Th2 (Yes in S5B), the proximity deciding unit 123 decides that the contact state is a release (State=Release) (step S6).

The proximity deciding unit 123 sets the initialization flag to TRUE (step S7). The initialization flag is used to decide whether the contact state is immediately after a touch or a touch is continued as the contact state, which will be described later in detail with reference step S11 to step S13.

The proximity deciding unit 123 executes processing to cause the correcting unit 122 to correct the reference value in the release state (step S8). Processing in which the correcting unit 122 corrects the reference value is processing to update the reference value. Processing in step S8 will be described later in detail with reference to FIG. 5.

Upon the completion of processing in step S8, the proximity deciding unit 123 decides whether to terminate the series of processing (step S9). When power is turned off, for example, the proximity deciding unit 123 terminates the series of processing.

If the proximity deciding unit 123 decides, in step S9, not to terminate the series of processing (decides to continue processing) (No in S9), the proximity deciding unit 123 causes the flow to return to step S4 so as to acquire the AD value and repeatedly execute processing. If the proximity deciding unit 123 decides, in step S9, to terminate the series of processing (Yes in S9), the proximity deciding unit 123 terminates the series of processing (END).

If the proximity deciding unit 123 decides in step S5B that the difference (AD value-reference value) is not smaller than the Off threshold value Th2 (No in S5B), the proximity deciding unit 123 decides whether to terminate the series of processing without updating the contact state (State) (step S9). Since the difference (AD value-reference value) is between the two thresholds (Th1 and Th2), the proximity deciding unit 123 regards the immediately previous state as being continued as the contact state.

If the proximity deciding unit 123 decides in step S5A that the difference (AD value—reference value) is larger than the On threshold value Th1 (Yes in S5A), the proximity deciding unit 123 decides that the contact state is a touch (State=Touch) (step S10).

The proximity deciding unit 123 decides whether the initialization flag is TRUE (step S11). In the release state, the initialization flag is set to TRUE (step S7). Upon the completion of touch state initialization processing, the initialization flag is set to FALSE (step S13). Therefore, when the proximity deciding unit 123 checks both the contact state and the initialization flag, the proximity deciding unit 123 can determine whether processing for touch state initialization (step S12) is required.

The proximity deciding unit 123 causes the correcting unit 122 to execute processing to initialize the touch state (step S12). Processing in step S12 will be described later in detail with reference to FIG. 6. Upon the completion of processing in step S12, the proximity deciding unit 123 sets the initialization flag to FALSE (step S13). Upon the completion of processing in step S13, the proximity deciding unit 123 causes the flow to proceed to step S9.

If the proximity deciding unit 123 decides in step S11 that the initialization flag is not TRUE (No in S11), the proximity deciding unit 123 causes the correcting unit 122 to execute processing to correct the reference value in the touch state (step S14). Processing in which the correcting unit 122 corrects the reference value is to update the reference value. Processing in step S14 will be described later in detail with reference to FIG. 7. Upon the completion of processing in step S14, the proximity deciding unit 123 causes the flow to proceed to step S9.

<Process by Correcting Unit 122 to Correct Reference Value in Release State>

Figure 5:
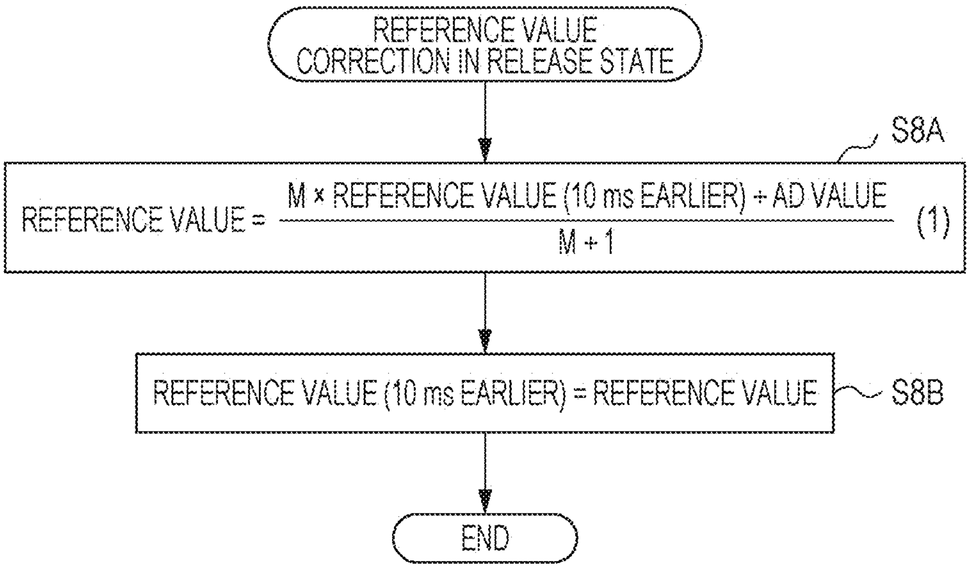
FIG. 5 is a flowchart representing reference value correction processing, which is executed by the MPU in the proximity deciding device in the embodiment, in a release state.

FIG. 5 illustrates processing in step S8 in detail. When the correcting unit 122 starts processing, illustrated in FIG. 5, to correct the reference value in the release state, the correcting unit 122 performs processing to correct the reference value in the release state (step S8A) according to equation (1) (step S8A). The correcting unit 122 multiplies the reference value (10 ms earlier) by the weight M according to equation (1) to obtain the weighted average of the AD value and reference value (10 ms earlier). The correcting unit 122 updates the reference value in the release state in this way. The correcting unit 122 assigns the reference value to the reference value (10 ms earlier) to prepare for re-execution of processing in step S8A (step S8B). This completes processing in which the correcting unit 122 corrects the reference value in the release state (END). Upon the completion of processing to correct the reference value, the flow proceeds to step S9 in FIG. 4. Time taken to execute processing in step S4 to step S9 is about 10 ms. Therefore, the reference value (10 ms earlier) indicates the reference value calculated about 10 ms earlier. However, time taken to execute processing in step S4 to step S9 may not be constant. Specifically, the reference value (10 ms earlier) may be a value calculated more than 10 ms earlier or may be a value calculated 1 ms to 10 ms earlier.

Process by Correcting Unit 122 to Initialize Touch State

Figure 6:
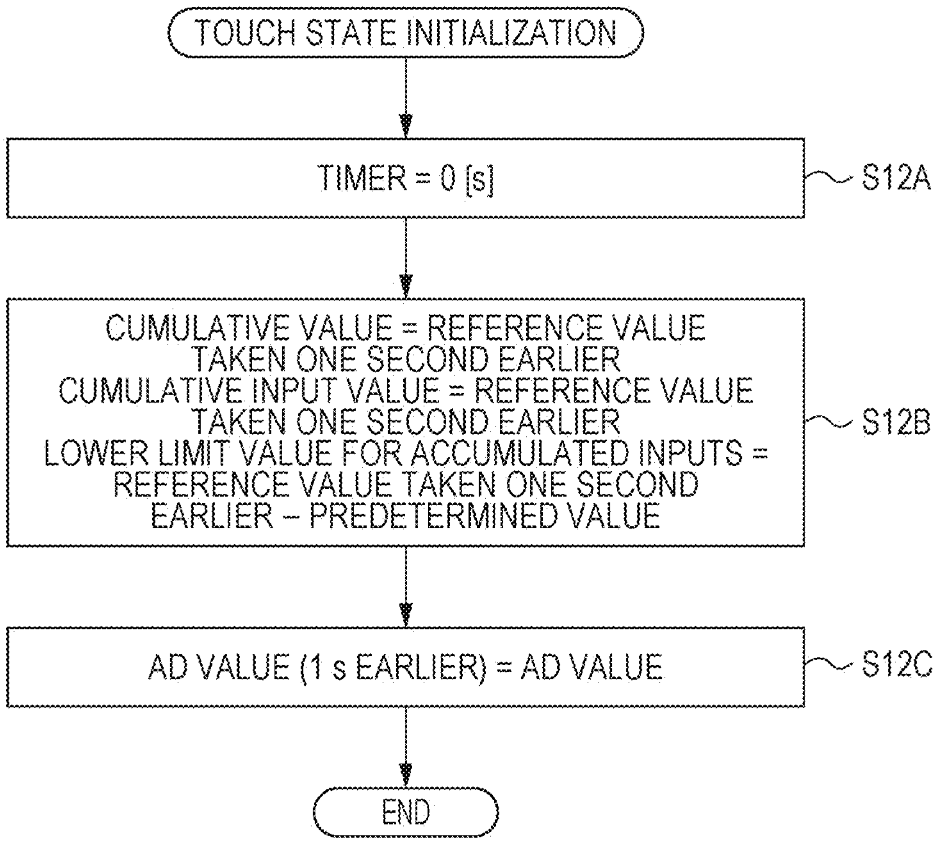
FIG. 6 is a flowchart representing touch state initialization processing executed by the MPU in the proximity deciding device in the embodiment.

FIG. 6 illustrates processing in step S12 in detail. The correcting unit 122 executes processing to initialize the touch state only when the initialization flag in FIG. 6 is TRUE. When the correcting unit 122 starts processing, illustrated in FIG. 6, to initialize the touch state, the correcting unit 122 sets the timer to 0 seconds (step S12A).

The correcting unit 122 sets the cumulative value to the reference value (1 s earlier), which was taken one second earlier, sets the cumulative input value to the reference value (1 s earlier), which was taken one second earlier, and sets the lower limit value for accumulated inputs to a value obtained by subtracting a predetermined value, which is 320 as an example, from the reference value (1 s earlier), which was taken one second earlier (step S12B). The value obtained by subtracting the predetermined value, which is 320 as an example, from the reference value (1 s earlier), which was taken one second earlier, is an example of a value obtained by subtracting a predetermined value from the reference value taken immediately before the proximity state was entered.

The correcting unit 122 sets the AD value (1 s earlier), which was taken one second earlier, to the current AD value (step S12C). The correcting unit 122 executes processing in step S12C for use in correction (update) of the reference value in the touch state one second later. This completes processing in which the correcting unit 122 initializes the touch state (END). Upon the completion of processing to initialize the touch state, the flow proceeds to step S9 in FIG. 4.

<Process by Correcting Unit 122 to Correct Reference Value in Touch State>

Figure 7:
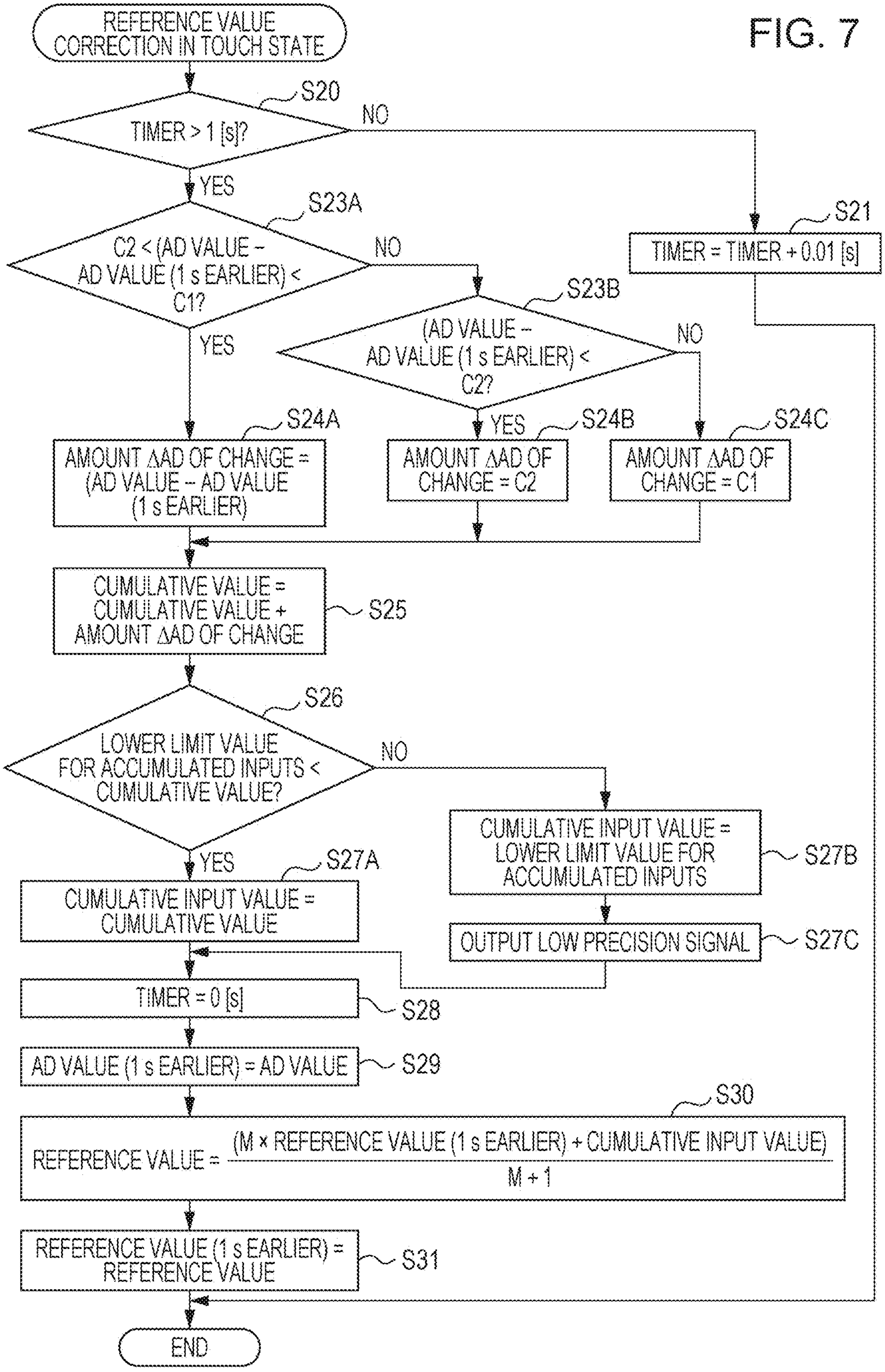
FIG. 7 is a flowchart representing proximity decision processing executed by the MPU in the proximity deciding device in the embodiment.

FIG. 7 illustrates processing in step S14 in detail. When the correcting unit 122 starts processing, illustrated in FIG. 7, to correct the reference value in the touch state, the correcting unit 122 decides whether the timer has reached one second or later (step S20). This step is to update the cumulative value at one-second intervals.

If the correcting unit 122 decides in step S20 that the timer has yet to reach one second or later (No in S20), the correcting unit 122 increments the count time of the timer by 0.01 second (10 ms) (step S21). In this embodiment, the correcting unit 122 acquires the AD value at 0.01-second intervals and performs processing to correct the reference value in the touch state at one-second intervals. Upon the completion of processing in step S21, the correcting unit 122 terminates the series of processing (END). Upon the completion of the series of processing, the flow proceeds to step S9 in FIG. 4.

If the correcting unit 122 decides in step S20 that the timer has reached one second or later (Yes in S20), the correcting unit 122 decides whether the amount of change of the AD value is larger than C2 and smaller than C1 (step S23A), the amount of change being obtained by subtracting the AD value (1 s earlier), which was taken one second earlier, from the current AD value. When temperature varies, the capacitance slightly changes. When the hand H moves, however, the capacitance greatly changes. Since the correcting unit 122 does not accumulate the amount of change of the AD value without limitation, but restricts the amount of change of the AD value to a value in a certain range and adds the restricted amount of change of the AD value to the previously calculated cumulative value, temperature-caused variations in capacitance can be accumulated. A value in a certain range, which is an example of a value in a predetermined range, is restricted by the lower limit value C2 and upper limit value C1. The lower limit value C2 and upper limit value C1 only need to be set to appropriate values according to the maximum magnitude up to which the sensitivity of the capacitive sensor electrode 110 changes due to a temperature change in one second. The lower limit value C2 is set to −50, and the upper limit value C1 is set to 50, as an example. The number of seconds by which the AD value to be subtracted from the current AD value is earlier is not limited to one second, but can be set to an appropriate value.

The HODECU 120 measures the AD value at 10-ms intervals. At the time of touch, however, the correcting unit 122 updates the reference value at one-second intervals. Therefore, step S20 produces a Yes result when the count time of the timer reaches one second.

If the correcting unit 122 decides in step S23A that the amount of change of the AD value is larger than C2 and is smaller than C1 (Yes in S23A), the correcting unit 122 sets the amount ΔAD of change of the AD value to the amount of change of the AD value, the amount of change being obtained by subtracting the AD value (1 s earlier), which was taken one second earlier, from the current AD value (step S24A). Upon the completion of processing in step S24A, the correcting unit 122 causes the flow to proceed to step S25. The amount of change of the AD value is an amount (difference) by which the AD value has changed, the amount of change being obtained by subtracting the AD value (1 s earlier), which was taken one second earlier, from the current AD value. The AD value is used in calculation of the cumulative value.

If the correcting unit 122 decides in step S23A that the amount of change of the AD value is not larger than C2 or is not smaller than C1 (No in S23A), the correcting unit 122 decides whether the amount of change of the AD value is smaller than or equal to C2 (step S23B).

If the correcting unit 122 decides in step S23B that the amount of change of the AD value is smaller than or equal to C2 (Yes in S23B), the correcting unit 122 sets the amount ΔAD of change of the AD value to C2 (step S24B). This means that the amount ΔAD of change of the AD value is set to the lower limit value C2 used to restrict the amount ΔAD of change of the AD value to a value in a certain range. Upon the completion of processing in step S24B, the correcting unit 122 causes the flow to proceed to step S25.

If the correcting unit 122 decides in step S23B that the amount of change of the AD value is not smaller than or equal to C2 (No in S23B), the correcting unit 122 sets the amount ΔAD of change of the AD value to C1 (step S24C). This means that since the amount of change of the AD value is larger than or equal to C1, the amount ΔAD of change of the AD value is set to the upper limit value C1 used to restrict the amount ΔAD of change of the AD value to a value in the certain range. Upon the completion of processing in step S24C, the correcting unit 122 causes the flow to proceed to step S25.

The correcting unit 122 adds the amount ΔAD of change of the AD value to the cumulative value at the current time to update the cumulative value (step S25). That is, the cumulative value (updated value) becomes equal to the cumulative value (value at the current time before the update) to which ΔAD is added.

The correcting unit 122 decides whether the lower limit value for accumulated inputs at the current time is smaller than the cumulative value that has been updated in step S25 (step S26). This decision is to decide whether the cumulative value has dropped to a too low value.

If the correcting unit 122 decides in step S26 that the cumulative value that has been updated in step S25 is larger than the lower limit value for accumulated inputs (Yes in S26), the correcting unit 122 updates the cumulative input value to the cumulative value updated in step S25 (step S27A). That is, the cumulative input value becomes equal to the cumulative value.

The correcting unit 122 resets the timer to 0 seconds (step S28) in order to count a next one second. The correcting unit 122 sets the AD value (1 s earlier), which was taken one second earlier, to the current AD value (step S29). That is, the AD value (1 s earlier) is set to the AD value. The purpose of this is to use the current AD value as the AD value (1 s earlier) that will be taken one second later to prepare for processing to be performed one second later. The number of seconds by which the AD value (1 s earlier) to be set as the current AD value is earlier is not limited to one second, but can be set to an appropriate value.

The correcting unit 122 calculates the reference value at the time of touch according to equation (2) (step S30). The correcting unit 122 multiplies the reference value (1 s earlier) by the weight M according to equation (2) to obtain the weighted average of the cumulative input value and reference value (1 s earlier). That is, the correcting unit 122 adds a correction value based on the cumulative input value to the reference value at a time when the hand H start to come into contact with the grip 11 of the steering wheel 10. Therefore, the proximity deciding device 100 can improve precision with which the reference value is corrected.

The correcting unit 122 assigns the reference value to the reference value (1 s earlier) (step S31). The correcting unit 122 performs processing in step S31 for use in correction (update) of the reference value in the touch state one second later.

If the correcting unit 122 decides in step S26 that the lower limit value for accumulated inputs at the current time is not smaller than the cumulative value updated in step S25 (No in S26), the correcting unit 122 sets the cumulative input value to the lower limit value for accumulated inputs (step S27B). Upon the completion of processing in step S27B, the correcting unit 122 causes the flow to proceed to step S27C. The correcting unit 122 outputs a signal indicating a drop in precision (low precision signal) (step S27C). Upon the completion of processing in step S27C, the correcting unit 122 causes the flow to proceed to step S28. Particularly, in hands-off detection (HoD), if the precision of the reference value is lowered, it is preferable for the release state to be likely to be decided for fail-safe purposes. When the cumulative value falls below the lower limit value for accumulated inputs, the precision of the reference value may have lowered. Therefore, to make the release state likely to be decided, the reference value is not set to a low value. Even if the strength of the hand H, of the user, with which the grip 11 of the steering wheel 10 is held, is gradually weakened, the cumulative input value does not drop to a too low value. Therefore, even if the grip strength gradually falls, the touch state can be correctly decided.

<Operation of Proximity Deciding Device 100>

Figure 8A:
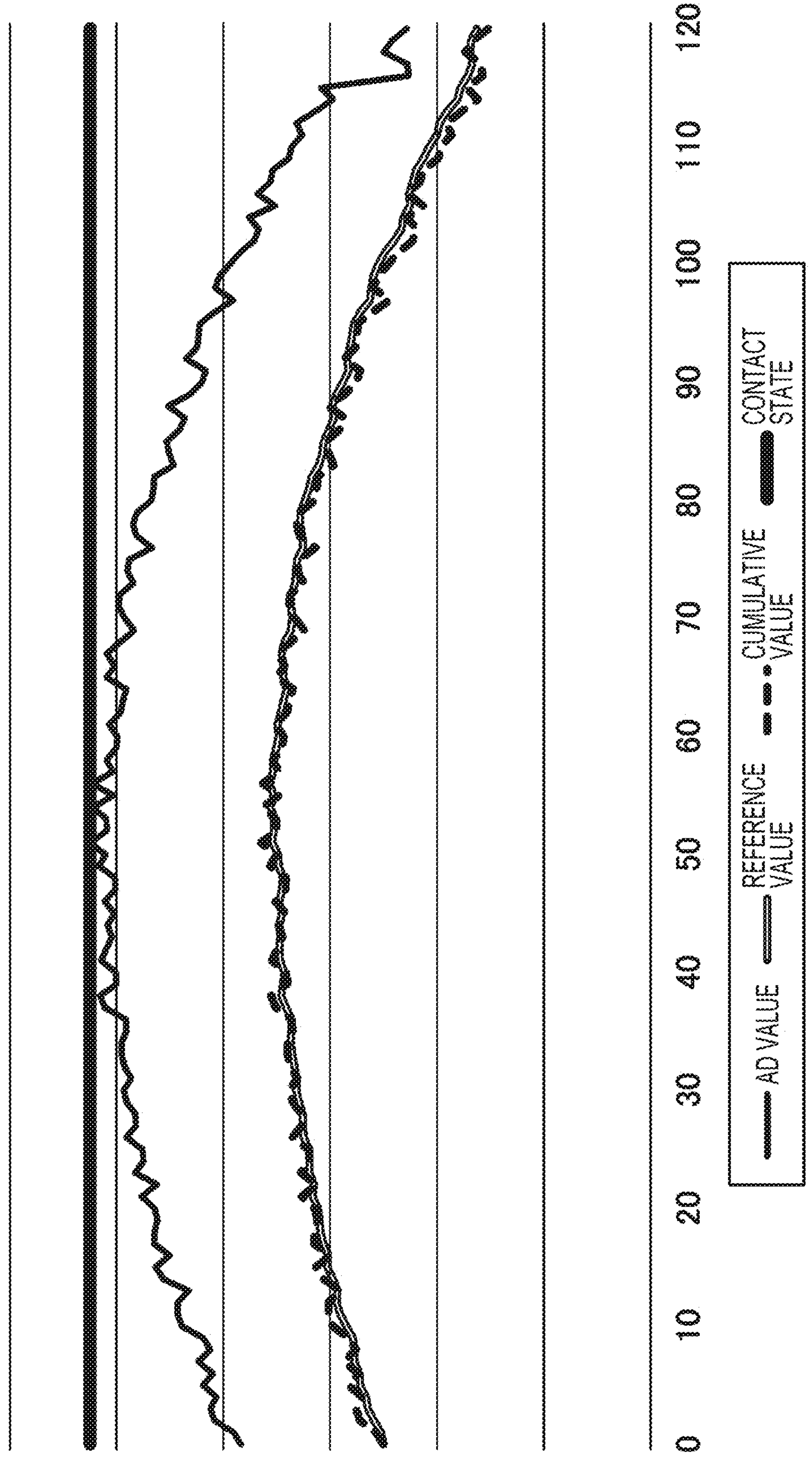
FIG. 8A illustrates an example of an operation of a proximity deciding device in comparative example 1.
Figure 8B:
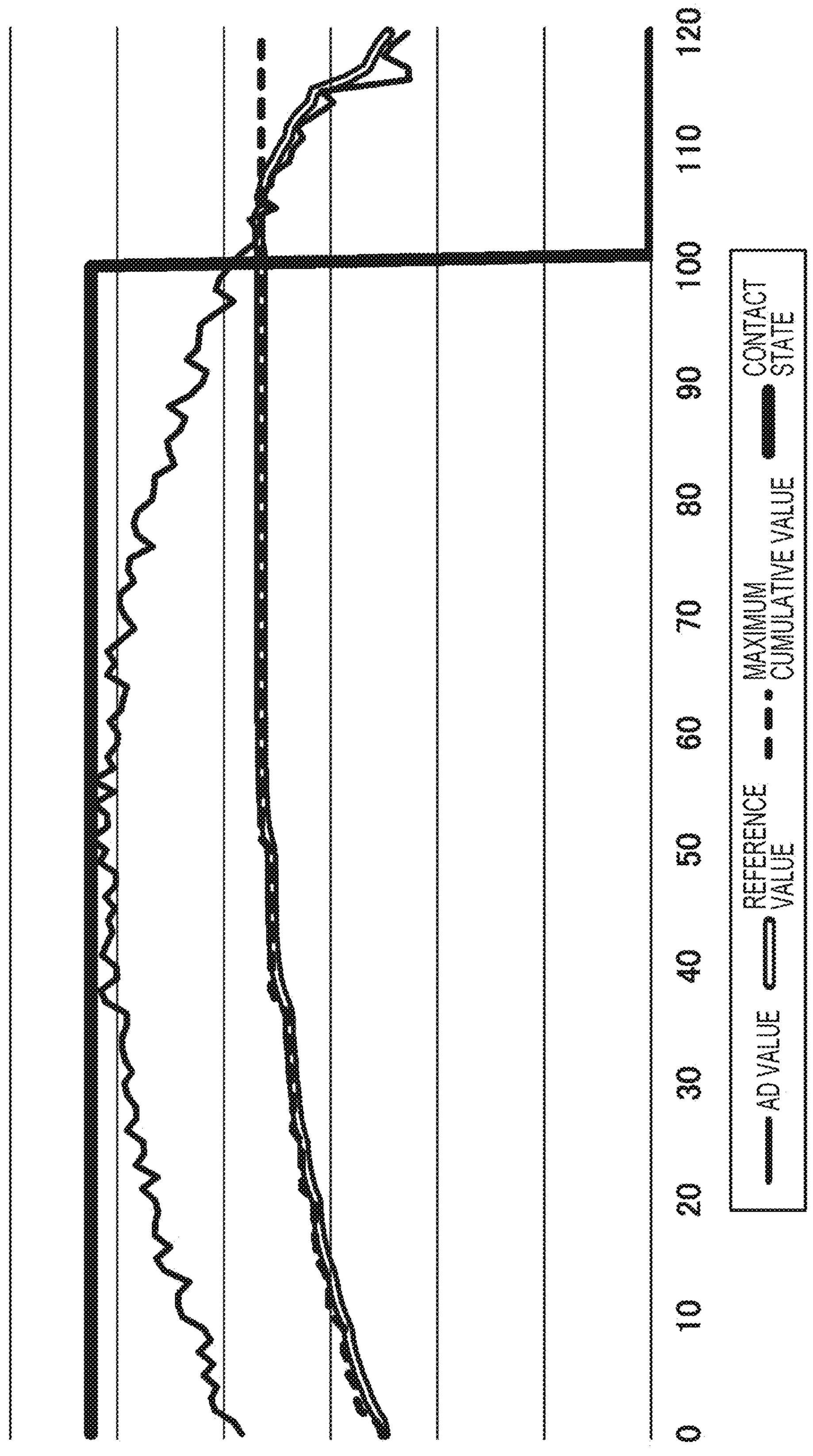
FIG. 8B illustrates an example of an operation of a proximity deciding device in comparative example 2.

Operations of proximity deciding devices in comparative examples 1 and 2 will be described before the operation of the proximity deciding device 100 is described. FIGS. 8A and 8B illustrate examples of operations of proximity deciding devices in comparative examples 1 and 2. The proximity deciding devices in comparative examples 1 and 2 are not the proximity deciding device 100 in the embodiment, but are proximity deciding devices for comparison purposes. The proximity deciding device in comparative example 1 constantly uses the cumulative value as the cumulative input value for the proximity deciding device 100 in the embodiment. The proximity deciding device in comparative example 2 uses a maximum cumulative value instead of the cumulative input value for the proximity deciding device 100 in the embodiment.

The maximum cumulative value is the maximum value among cumulative values. Specifically, the maximum cumulative value is the maximum value when a variation direction in which the AD value varies according to the extent of contact increases (a direction in which the AD value is increased) is taken as the positive direction.

In FIGS. 8A and 8B, the horizontal axis represents time. In FIG. 8A, the AD value, the reference value, the cumulative value, and a contact state are illustrated. The AD value, reference value, and cumulative value are each represented as the count value of the capacitance. In FIG. 8B, the AD value, the reference value, the maximum cumulative value, and a contact state are illustrated. The AD value, reference value, and maximum cumulative value are each represented as the count value of the capacitance. The AD value is a measured value. The contact state represents the release state (0) or touch state (1) as the result of a decision by the proximity deciding devices in comparative examples 1 and 2.

In FIGS. 8A and 8B, the temperature of the capacitive sensor electrode 110 was-20° C. at time 0. The temperature rose with the elapse of time until the temperature reached 50° C. at time 50. The temperature started to fall at time 50 and reached −20° C. at time 100. The hand H of the user was in contact with the grip 11 of the steering wheel 10 in a range from time 0 to time 115. In the experiment, a human body phantom was used as the hand H of the user.

In comparative example 1 in FIG. 8A, the reference value changed in a range from time 0 to time 120 as the AD value was increased or decreased. However, since the cumulative value fell to a too low value due to the accumulation of error of the cumulative value, the touch state (1) continued even at and after time 115. In the state at that time, the contact state was decided as the touch state (1) in spite of the hand H being away from the grip 11 of the steering wheel 10.

In comparative example 2 in FIG. 8B, the reference value changed in a range from time 0 to around time 50 as the AD value was increased. However, at and after around time 50, at which the temperature started to drop, the AD value was decreased and the reference value became constant. Since the reference value was not correctly calculated, the contact state was changed to the release state (0) at around time 100. In the state at that time, the contact state was decided as the release state (0) in spite of the hand H being in contact with the grip 11 of the steering wheel 10. In comparative example 2, in a state in which the hand H was away from the grip 11 of the steering wheel 10, the proximity deciding device almost surely decided that the contact state is the release state (0), indicating that fail-safe has been achieved.

As described above, if the temperature of the capacitive sensor electrode 110 excessively changes in a state in which the hand His in contact with the grip 11 of the steering wheel 10, the proximity deciding devices in the comparative examples may not make a correct decision about the contact state.

Figure 9:
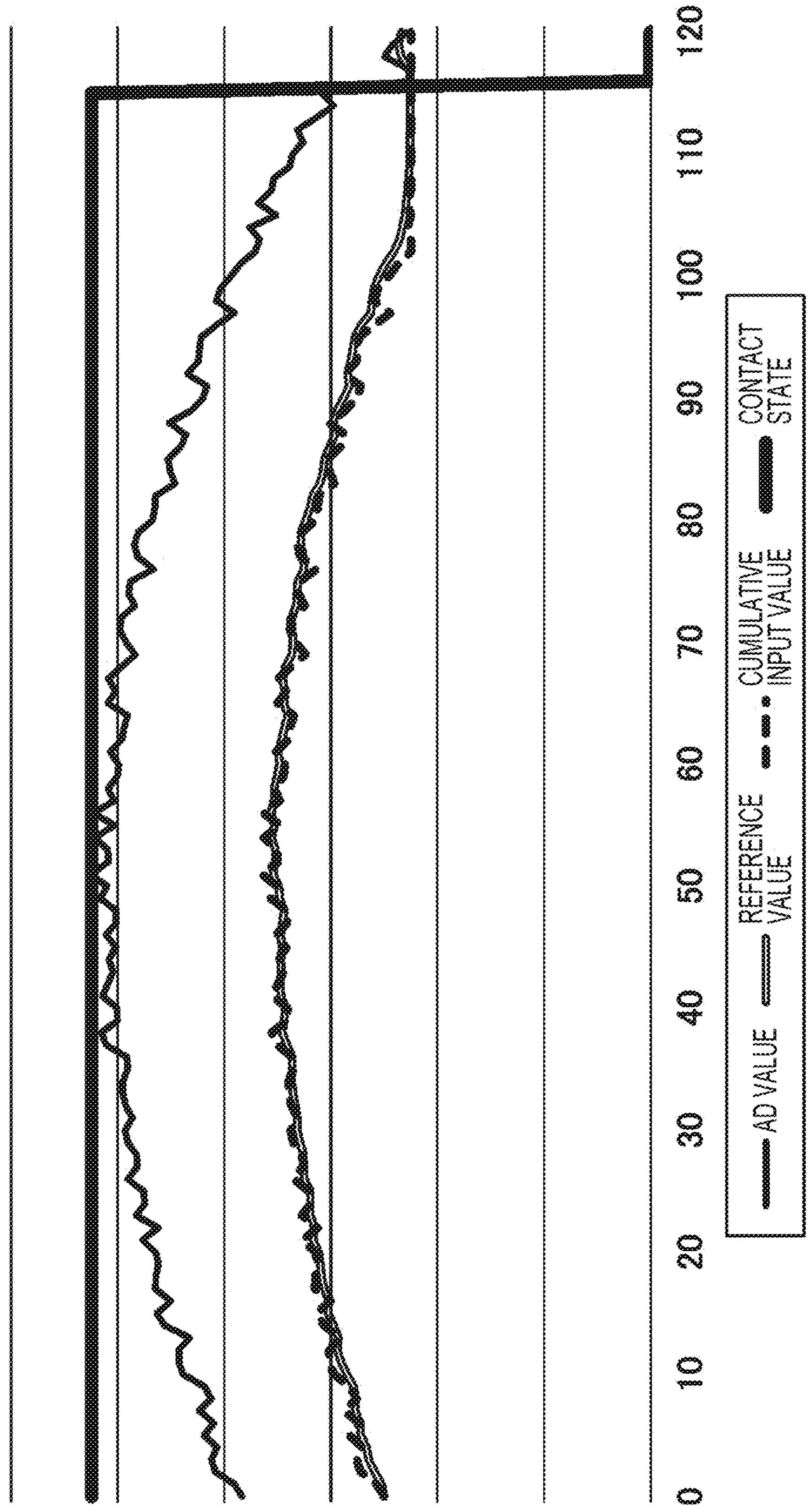
FIG. 9 illustrates an example of an operation of the proximity deciding device in the embodiment.

FIG. 9 illustrates an example of an operation of the proximity deciding device 100 in the embodiment. In FIG. 9, the horizontal axis indicates time (in seconds). In FIG. 9, the AD value, the reference value, the cumulative input value, and a contact state are each represented as the count value of the capacitance. The contact state represents the release state (0) or touch state (1) as the result of a decision by the proximity deciding device 100. In the proximity deciding device 100, illustrated in FIG. 9, in the embodiment, the temperature was changed under the same conditions as in the proximity deciding device in comparative example 1 in FIG. 8A and the proximity deciding device in comparative example 2 in FIG. 8B, and the hand H of the user was moved at the same time as in these proximity deciding devices. Specifically, in the proximity deciding device 100, in FIG. 9, in the embodiment, the temperature of the capacitive sensor electrode 110 was −20° C. at time 0. The temperature rose with the elapse of time until the temperature reached 50° C. at time 50. The temperature then started to fall at time 50 and reached −20° C. at time 100. The hand H of the user was in contact with the grip 11 of the steering wheel 10 in a range from time 0 to time 115.

In the proximity deciding device 100 in the embodiment, the reference value changed in a range from time 0 to around time 100 as the AD value was increased or decreased, as illustrated in FIG. 9. The cumulative value was used as the cumulative input value in a range from time 0 to around time 100. The reference value, which is the weighted average of the reference value and cumulative input value, gently changed. The lower limit value for accumulated inputs was used as the cumulative input value in a range from around time 100 to around time 115. The reference value became a value close to the lower limit value for accumulated inputs. At and after around time 115, the hand H of the user was away from the grip 11. Therefore, the AD value rapidly dropped at around time 115. Along with the drop of the AD value, the decision result for holding changed to the release state (0).

In this example, the proximity deciding device 100 was capable of making a correct decision about the touch state even when the temperature of the capacitive sensor electrode 110 changed. Even if the strength of the hand H, of the user, with which the grip 11 of the steering wheel 10 is held, is gradually weakened, the cumulative value also drops. However, the cumulative input value does not fall below the lower limit value for accumulated inputs. Therefore, even if the grip strength gently changes, a correct decision can be made about the touch state. Although not illustrated, if the precision of the cumulative input value is lowered due to a further drop of the temperature of the capacitive sensor electrode 110 and a correct decision cannot be thereby made as to whether the hand H is in contact with the grip 11, the release state (0) is made to be easily decided.

In HoD, if a decision cannot be made, it is preferable for the release state (0) to be decided for fail-safe purposes. In this embodiment, a lower limit is set for the cumulative input value used in calculation of the reference value. Therefore, if a decision cannot be made when the touch state (1) continues, the contact state is regarded as the release state (0). The proximity deciding device 100 in the embodiment is similar to the proximity deciding device in comparative example 2 in that a fail-safe function is provided. However, the proximity deciding device 100 in the embodiment achieves the fail-safe function by a method different from the method used by the proximity deciding device in comparative example 2, so the proximity deciding device 100 almost surely detects the release state (0) and achieves higher detection precision than the proximity deciding device in comparative example 2.

This completes the description of an aspect in which the proximity deciding device 100 is used in decision in HoD. However, the use of the proximity deciding device 100 is not limited to decision in HoD. If part of a living body such as the hand H is placed in contact with an object in which the capacitive sensor electrode 110 is disposed for a comparatively long time, the proximity deciding device 100 can similarly make a decision about the contact state. If a product needs a similar fail-safe function in other than HoD, effects similar to those in HoD can be obtained.

Effects

The proximity deciding device 100 includes: the capacitive sensor electrode 110 covered with a cover (grip 11) having a manipulation surface; a measurement circuit (AFE 120A) that measures capacitance between the capacitive sensor electrode 110 and an indicating body; the proximity deciding unit 123 that makes a decision as to whether a proximity state, in which the indicating body is approaching the capacitive sensor electrode 110, is in progress according to a difference obtained by subtracting a reference value from the capacitance (AD value) measured by the measurement circuit (AFE 120A); the correcting unit 122 that corrects the reference value; and a storage unit (memory 124). The correcting unit 122 stores a lower limit value for accumulated inputs, the lower limit value being based on the reference value before the proximity state is entered, in the storage unit (memory 124); calculates, in the proximity state, a cumulative value for a change of the capacitance; updates the reference value according to a cumulative input value, which takes either the cumulative value or the lower limit value for accumulated inputs; sets, if the cumulative value is larger than the lower limit value for accumulated inputs, the cumulative input value to the cumulative value; and sets, if the cumulative value is smaller than the lower limit value for accumulated inputs, the cumulative input value to the lower limit value for accumulated inputs. Therefore, even if the temperature of the capacitive sensor electrode 110 rises or falls, when the cumulative input value is changed according to the cumulative value, the reference value can be appropriately updated. If the temperature of the capacitive sensor electrode 110 rises, the reference value can be increased. If the temperature of the capacitive sensor electrode 110 falls, the reference value can be decreased. In addition, since the reference value does not drop to a too low value, the release state can be almost surely decided.

Therefore, to enable a correct decision to be made about proximity of the indicating body, the proximity deciding device 100 can be provided that can appropriately update the reference value according to the rise or fall of the temperature.

The lower limit value for accumulated inputs may be a value obtained by subtracting a predetermined value from the reference value before the proximity state is entered. When the lower limit value for accumulated inputs, the lower limit value being obtained by subtracting a predetermined value from the reference value before the proximity state is entered, is used, the reference value can be appropriately updated according to the rise or fall of the temperature of the capacitive sensor electrode 110.

The correcting unit 122 may set an upper limit value and a lower limit value for the amount of change of the capacitance (AD value) per unit time. Then, the correcting unit 122 may set the amount of change to the lower limit when the amount of change is smaller than the lower limit, and may set the amount of change to the upper limit when the amount of change is larger than the upper limit. When an upper limit value and a lower limit value are appropriately set for the amount of change of the capacitance (AD value) per unit time, the amount of change of the AD value is not accumulated without limitation, but can be restricted to a value in a certain range, after which the restricted amount of accumulated change can be added to the previously calculated cumulative value. When the amount of change is restricted to a value in a certain range, the reference value can be appropriately updated.

In the proximity state, the correcting unit 122 may obtain the weighted average of the reference value and cumulative input value to correct the reference value. Alternatively, in a non-proximity state, in which the indicating body is not close to the capacitive sensor electrode 110, the correcting unit 122 may obtain the weighted average of the reference value and capacitance (AD value) to correct the reference value. The proximity deciding device 100 can be provided that can obtain, in the proximity state and non-proximity state, an appropriate reference value from the weighted average of the reference value and cumulative input value, and can appropriately update the reference value according to the rise or fall of temperature.

In a proximity deciding method in which the proximity deciding device 100 includes: the capacitive sensor electrode 110 covered with a cover (grip 11) having a manipulation surface; a measurement circuit (AFE 120A) that measures capacitance between the capacitive sensor electrode 110 and an indicating body; the proximity deciding unit 123 that makes a decision as to whether a proximity state, in which the indicating body is approaching the capacitive sensor electrode 110, is in progress according to a difference obtained by subtracting a reference value from the capacitance measured by the measurement circuit (AFE 120A); the correcting unit 122 that corrects the reference value; and a storage unit (memory 124), the correcting unit 122 stores a lower limit value for accumulated inputs, the lower limit value being based on the reference value before the proximity state is entered, in the storage unit (memory 124); calculates, in the proximity state, a cumulative value for a change of the capacitance; updates the reference value according to a cumulative input value, which takes either the cumulative value or the lower limit value for accumulated inputs; sets, if the cumulative value is larger than the lower limit value for accumulated inputs, the cumulative input value to the cumulative value; and sets, if the cumulative value is smaller than the lower limit value for accumulated inputs, the cumulative input value to the lower limit value for accumulated inputs. Therefore, even if the temperature of the capacitive sensor electrode 110 rises or falls, when the cumulative input value is changed according to the cumulative value, the reference value can be appropriately changed. If the temperature of the capacitive sensor electrode 110 rises, the reference value can be increased. If the temperature of the capacitive sensor electrode 110 falls, the reference value can be decreased.

Therefore, to enable a correct decision to be made about proximity of the indicating body, the proximity deciding method can be provided by which the reference value can be appropriately updated according to the rise or fall of the temperature.

This completes the description of the proximity deciding device and proximity deciding method in an exemplary embodiment of the present invention. However, the present invention is not limited to specifically disclosed embodiments, but can be varied and modified in various other ways without departing from the scope of the claims.

What is claimed is:

1. A proximity deciding device comprising:
a capacitive sensor electrode covered with a cover having a manipulation surface;
a measurement circuit configured to repeatedly measure capacitance between the capacitive sensor electrode and an indicating body which manipulates the manipulation surface, and output a measured capacitance value for each measurement;
a proximity deciding unit configured to determine whether the indicating body is in a proximity state, in which the indicating body is in a vicinity of the capacitive sensor electrode, based on a corrected capacitance value which is obtained by subtracting a reference value from the measured capacitance value;
a correcting unit configured to correct the reference value; and
a storage unit for storing a minimum cumulative value which is a lower limit for a cumulative value used to correct the reference value,
wherein the correcting unit is further configured to:
set the minimum cumulative value based on an initial reference value which is the reference value immediately before the indicating body is determined to be in the proximity state;
calculate, when the indicating body is in the proximity state, the cumulative value by accumulating a change in the measured capacitance value for a plurality of measurements; and
update the reference value based on a cumulative input value, wherein the cumulative input value is set to the calculated cumulative value when the calculated cumulative value is greater than the minimum cumulative value, while the cumulative input value is set to the minimum cumulative value when the calculated cumulative value is smaller than the minimum cumulative value.

2. The proximity deciding device according to claim 1, wherein the minimum cumulative value is obtained by subtracting a predetermined value from the initial reference value.

3. The proximity deciding device according to claim 1, wherein the correcting unit is further configured to:
set an upper limit and a lower limit for an amount of change in the measured capacitance value per unit time;
set the amount of change to the lower limit when the amount of change is smaller than the lower limit; and
set the amount of change to the upper limit when the amount of change is greater than the upper limit.

4. The proximity deciding device according to claim 1, wherein the correcting unit is configured to update the reference value:
by calculating a weighted average of a previous reference value which is the reference value obtained in a previous measurement and the cumulative input value in a current measurement, when the indicating body is in the proximity state; and
by calculating a weighted average of the previous reference value and the measured capacitance value in the current measurement, when the indicating body is in a non-proximity state, in which the indicating body is not in the vicinity of the capacitive sensor electrode.

5. A proximity deciding method using a proximity deciding device including a capacitive sensor electrode covered with a cover having a manipulation surface which is manipulated by an indicating body, a measurement circuit, a correcting unit, and a storage unit, the method comprising:
repeatedly measuring, by the measurement circuit, capacitance between the capacitive sensor electrode and the indicating body, thereby outputting a measured capacitance value for each measurement;
determining whether the indicating body is in a proximity state, in which the indicating body is in a vicinity of the capacitive sensor electrode, based on a corrected capacitance value which is obtained by subtracting a reference value from the measured capacitance value, the determining including correcting the reference value using the correcting unit, wherein the correcting the reference value includes:

storing, in the storage unit, a minimum cumulative value which is a lower limit for a cumulative value used to correct the reference value;

setting the minimum cumulative value based on an initial reference value which is the reference value immediately before the indicating body is determined to be in the proximity state;

calculating, when the indicating body is in the proximity state, the cumulative value by accumulating a change in the measured capacitance value for a plurality of measurements;

updating the reference value based on a cumulative input value, wherein the cumulative input value is set to the calculated cumulative value when the calculated cumulative value is greater than the minimum cumulative value, and the cumulative input value is set to the minimum cumulative value when the calculated cumulative value is smaller than the minimum cumulative value.

6. The proximity deciding method according to claim 5, wherein the correcting the reference value further includes:

updating the reference value by calculating a weighted average of a previous reference value which is the reference value obtained in a previous measurement and the cumulative input value in a current measurement, when the indicating body is in the proximity state; and updating the reference value by calculating a weighted average of the previous reference value and the measured capacitance value in the current measurement, when the indicating body is in a non-proximity state, in which the indicating body is not in the vicinity of the capacitive sensor electrode.

7. The proximity deciding device according to claim 1, wherein the proximity deciding unit is further configured to determine that the indicating body is in a touch state when the corrected capacitance value exceeds a first threshold.

8. The proximity deciding device according to claim 7, wherein the proximity deciding unit is further configured to determine that indicating body is in a release state when the corrected capacitance value is smaller than a second threshold lower than the first threshold.

* * * * *